US012353197B2

(12) United States Patent
Benjwal et al.

(10) Patent No.: US 12,353,197 B2
(45) Date of Patent: Jul. 8, 2025

(54) SYSTEM CONTEXTUALIZATION OF MANUFACTURING PLANTS

(71) Applicant: Accenture Global Solutions Limited, Dublin (IE)

(72) Inventors: Neeraj Benjwal, Delhi (IN); Pramod Kumar Shrivastava, Pune (IN); Roopa Shivani Dhananjaya, Bengaluru (IN); Samiksha Hariharan, Bangalore (IN); Trilok Rangan, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 386 days.

(21) Appl. No.: 17/899,278

(22) Filed: Aug. 30, 2022

(65) Prior Publication Data

US 2024/0069532 A1    Feb. 29, 2024

(51) Int. Cl.
G05B 19/418    (2006.01)

(52) U.S. Cl.
CPC .... *G05B 19/41865* (2013.01); *G05B 19/4183* (2013.01)

(58) Field of Classification Search
None
See application file for complete search history.

(56) References Cited

U.S. PATENT DOCUMENTS

| | | | | |
|---|---|---|---|---|
| 6,816,747 B2* | 11/2004 | Mammoser | ........... | G06Q 10/06 700/109 |
| 7,027,886 B2* | 4/2006 | Hoppes | .............. | G05B 19/4184 700/95 |
| 7,177,773 B2* | 2/2007 | Lonn | ..................... | G06F 11/008 702/182 |
| 7,263,510 B2* | 8/2007 | Chandler | ............... | G06Q 10/10 700/109 |
| 7,516,025 B1* | 4/2009 | Williams | ........... | G05B 23/0278 702/182 |
| 9,535,808 B2* | 1/2017 | Bates | ................... | G05B 23/024 |
| 11,687,068 B2* | 6/2023 | Höfig et al. | ........... | G06Q 50/04 700/115 |
| 2003/0139837 A1* | 7/2003 | Marr | .................. | G05B 23/0278 700/110 |
| 2004/0002950 A1* | 1/2004 | Brennan | .......... | G05B 19/41885 |

(Continued)

FOREIGN PATENT DOCUMENTS

JP    H0666607 A  *  3/1994
JP    H06201415 A  *  7/1994

(Continued)

*Primary Examiner* — Jason Lin
(74) *Attorney, Agent, or Firm* — POLSINELLI PC (57) ABSTRACT

Methods, systems, and apparatus, including computer programs encoded on computer-storage media, for system contextualization. For example, a method can include obtaining information pertaining to (i) parts of a manufacturing plant and (ii) steps of a process executing on the manufacturing plant; generating one or more virtual representations associated with each of the parts and the steps of the process; receiving a query from a user, the query being in conformation with a format of a hierarchical template model; and generating a response to the query based on the one or more virtual representations of the manufacturing plant.

17 Claims, 4 Drawing Sheets

(56) References Cited

U.S. PATENT DOCUMENTS

| | | | | |
|---|---|---|---|---|
| 2009/0150325 A1* | 6/2009 | De | ............................ | G06N 7/01 |
| | | | | 715/764 |
| 2013/0346163 A1* | 12/2013 | Kemmer | ................. | G06Q 10/20 |
| | | | | 705/7.41 |
| 2014/0012405 A1* | 1/2014 | Raviola | ................... | G06F 17/00 |
| | | | | 700/100 |
| 2015/0039386 A1* | 2/2015 | Kymal | ................ | G06Q 10/0635 |
| | | | | 705/7.28 |
| 2016/0154911 A1* | 6/2016 | Altare | ..................... | G06F 30/18 |
| | | | | 703/13 |

FOREIGN PATENT DOCUMENTS

| | | |
|---|---|---|
| KR | 101057614 | 8/2011 |
| KR | 101104118 | 1/2012 |
| KR | 101371006 | 3/2014 |
| KR | 101530848 | 6/2015 |
| KR | 101661818 | 9/2016 |
| LU | 500417 A1 * | 12/2021 |

\* cited by examiner

```
┌─────────────────────────────────────────────┐
│ OBTAIN INFORMATION PERTAINING TO (I) PARTS OF A │
│ MANUFACTURING PLANT AND (II) STEPS OF A PROCESS │
│ EXECUTING ON THE MANUFACTURING PLANT    202 │
└─────────────────────────────────────────────┘
                      ↓
┌─────────────────────────────────────────────┐
│ GENERATE ONE OR MORE VIRTUAL                │
│ REPRESENTATIONS ASSOCIATED WITH EACH OF THE │
│ PARTS AND THE STEPS OF THE PROCESS BY (I)   │
│ MAPPING EACH OF THE PARTS TO AN ELEMENT OF A│
│ HIERARCHICAL TEMPLATE MODEL CONFORMING TO A │
│ PRE-DEFINED TAXONOMY, AND (II) DEFINING     │
│ RELATIONSHIPS AMONG THE PARTS AND THE STEPS │
│ OF THE PROCESS                         204  │
└─────────────────────────────────────────────┘
                      ↓
┌─────────────────────────────────────────────┐
│ RECEIVE A QUERY FROM A USER            206  │
└─────────────────────────────────────────────┘
                      ↓
┌─────────────────────────────────────────────┐
│ GENERATE A RESPONSE TO THE QUERY BASED ON   │
│ THE ONE OR MORE VIRTUAL REPRESENTATIONS OF  │
│ THE MANUFACTURING PLANT                208  │
└─────────────────────────────────────────────┘
```

SYSTEM CONTEXTUALIZATION OF MANUFACTURING PLANTS

BACKGROUND

Manufacturing plants, or other systems, perform processes using one or more assets. Errors or deviations in one part of a production line can propagate to other parts obfuscate the true cause, otherwise referred to as a root cause, of the error or deviation.

SUMMARY

In modern, connected, manufacturing industry, assets (e.g., manufacturing equipment, transportation devices, among others) along with processes, follow a defined, standard taxonomy and ontology. Assets and processes can be represented virtually as digital entities that are also referred to as digital twins. Digital twins of various portions of a plant and processes executed therein, together with their interrelationships and contextual information, can be used to represent and monitor an entire system.

Techniques described herein include methods to automatically build graphical models, such as digital twins, and build an ontology for standardized or non-standardized input data. The graphical models, such as a manufacturing plant analytics graph (MPAG), can define a standard namespace.

In some implementations, a MPAG corresponding to a contextualized digital twin is generated and used to process queries about manufacturing assets. The queries can be obtained in a standard or non-standard format, and a model of the digital twins corresponding to various portions of a particular manufacturing plant and processes can be used to provide information about operating conditions of the manufacturing plant. The model of the digital twins can be generated to conform to certain taxonomy and ontology. Provided information can include details about alerts, process flows, assets, associated parts, materials, and operational status, among others. Using an automatically generated model of digital twins (also referred to simply as the digital twin of the manufacturing plant) users can obtain information indicating status or problems within any given system, including root causes of issues that are otherwise extremely challenging to ascertain.

In some implementations, the technology described herein can provide the following advantages. By automatically mapping various portions of systems and processes to a standard taxonomy and ontology, a standardized model of the manufacturing plant can be generated automatically, with minimal manual intervention. Such a standardized model in turn can allow for contextualizing/formatting non-standard data usable for analyzing various operational characteristics of the system. The interrelationships of various portions of the systems and processes—as defined in the standardized model—can be leveraged to identify root causes of alerts/issues in complex interconnected systems. This in turn can result in speedy resolution of the root causes, thereby resulting in an efficient operation of the underlying system.

One innovative aspect of the subject matter described in this specification is embodied in a method that includes obtaining information pertaining to (i) parts of a manufacturing plant and (ii) steps of a process executing on the manufacturing plant; generating one or more virtual representations associated with each of the parts and the steps of the process by (i) mapping each of the parts to an element of a hierarchical template model conforming to a pre-defined taxonomy, and (ii) defining relationships among the parts and the steps of the process; receiving a query from a user, the query being in conformation with a format of the hierarchical template model; and generating a response to the query based on the one or more virtual representations of the manufacturing plant.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, actions include receiving run-time data pertaining to one or more metrics associated with at least one particular part of the manufacturing plant; updating a status of a corresponding virtual representation associated with the particular part; and updating a status of each of one or more virtual representations connected to the particular part as defined by the relationships among the parts and the steps of the process.

In some implementations, actions include receiving at least one alert indicating that a metric associated with a particular part of the manufacturing plant satisfies a first predetermined condition; identifying a second virtual representation that is connected to a first virtual representation of the particular part as defined by the relationships among the parts and the steps of the process; determining that a status or metric associated with the second virtual representation satisfies a second predetermined condition; and responsive to determining that the status or metric associated with the second virtual representations satisfies the second predetermined condition, identifying the status or metric associated with the second virtual representation as a root cause associated with the at least one alert.

In some implementations, the second virtual representation is directly connected to the first virtual representation. In some implementations, the second virtual representation is connected to the first virtual representation through at least a third virtual representation. In some implementations, the virtual representations and interrelationships thereof are represented as a directed graph. In some implementations, mapping each of the parts to an element of the hierarchical template model conforming to the pre-defined taxonomy includes converting non-standardized input of the information into a standardized format.

Another innovative aspect of the subject matter described in this specification is embodied in a method that includes obtaining a hierarchical structure; obtaining user data indicating elements of the hierarchical structure; generating a standardized format using the hierarchical structure and the user data; obtaining data from one or more units associated with a manufacturing process over a network, wherein the data is in a non-standardized format dependent on the hardware and software platform used by the one or more units; converting the non-standardized input into the standardized format; obtaining a query from a user; and providing a response to the user indicating an aspect of the manufacturing process using the standardized format.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, the elements of the hierarchical structure represent one or more manufacturing elements within the manufacturing process.

In some implementations, the query from the user is in a non-standardized format. In some implementations, actions include converting the query from the non-standardized format to a standard corresponding to the standardized format. In some implementations, the standardized format includes a digital representation of the manufacturing process. In some implementations, the standardized format includes a directed graph. In some implementations, before providing the response to the user, actions include adjusting a time corresponding to an event in the data from the one or more units associated with the manufacturing process.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
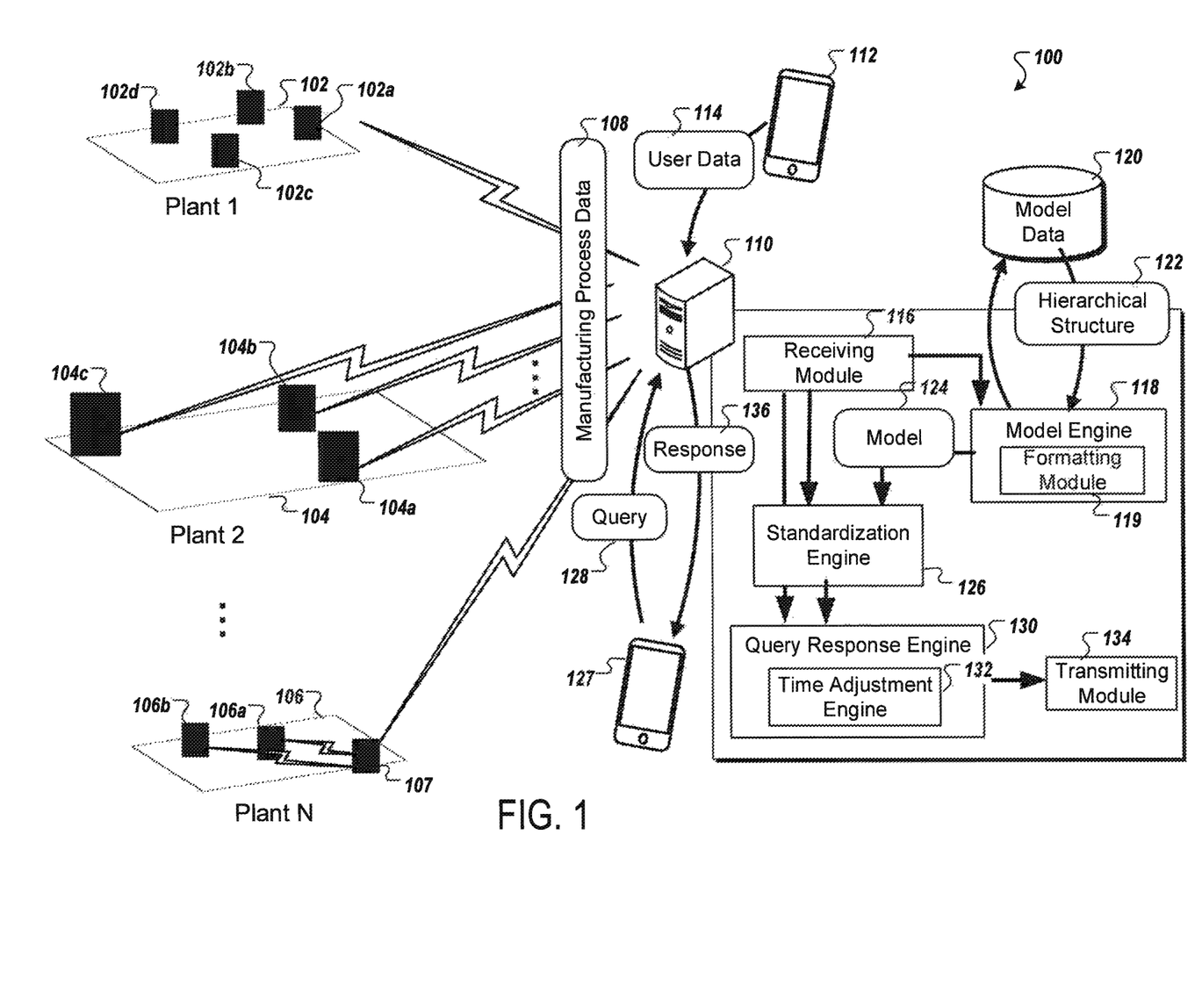
FIG. 1 is a diagram showing an example of a system for system contextualization.

FIG. 1 is a diagram showing an example of a system 100 for system contextualization. The system 100 includes manufacturing plants 102, 104, and 106, a control unit 110, device 112, and device 127. The control unit 110 obtains user data 114 from the device 112 and manufacturing process data 108 from one or more units of the plants 102, 104, and 106. The control unit 110 generates a model 124 using the user data 114. The control unit 110 converts the manufacturing process data 108 from one or more units of the plants 102, 104, and 106 using the model 124 to a standard format. The control unit 110 generates responses, such as response 136, to queries using the converted manufacturing data.

The control unit 110 obtains the user data 114 from the device 112. In some implementations, the control unit 110 obtains the user data 114 from the device 112 before obtaining the manufacturing process data 108. For example, the control unit 110 can generate the model 124 to convert the manufacturing process data 108 using the user data obtained from the device 112.

In some implementations, the device 112 is a portable device (e.g., a smartphone, tablet, among others). In some implementations, the device 112 is a computer. For example, the device 112 can include one or more processors or modules to obtain user input data. The device 112 can obtain template, attribute, or relationship data. The device 112 can generate the user data 114 as a data package that includes one or more of the template, attribute, and relationship data.

In some implementations, template data includes properties of an entity (e.g., a site, plant, process, asset, among others) or schema of a property or plant. A schema can include a JavaScript Object Notation for Linked Data (JSON-LD) or open source alternatives. The schema can help to track, trace and solve problems. Template data can include information related to a relationship that can exist between entities. Relationships can be used by the control unit 110 to generate a set of rules based on which of two or more entities or digital representations can be connected with one another. In some implementations, template data is stored in XML, CSV, or JSON format.

The control unit 110 obtains the user data 114. A receiving module 116 of the control unit 110 can receive the user data 114 using one or more receiving elements. In some implementations, the control unit 110 and the device 112 are communicably connected. For example, the receiving module 116 can be an interface configured to process wired or wireless signals sent from the device 112. In some implementations, the receiving module 116 is a radio frequency (RF) transmission interface. For example, the receiving module 116 can receive RF signals generated and sent by the device 112.

In some implementations, one or more processors of the control unit 110 operate one or more elements (e.g., receiving module 116, model engine 118, formatting module 119, model data 120, standardization engine 126, query response engine 130, time adjustment engine 132, transmitting module 134) shown in FIG. 1. For example, the control unit 110 can process incoming data, e.g., from the device 112, using the receiving module 116 and generate output data. The output data can be used in subsequent processes performed by elements of the control unit 110. In some implementations, the control unit 110 is communicably connected to one or more devices that perform operations corresponding to one or more elements shown in FIG. 1. For example, the control unit 110 can be communicably connected to a server that operates model engine 118 or stores model data 120.

The control unit 110 provides the user data 114 to the model engine 118. The model engine 118 generates a model using a formatting module 119. In some implementations, the model engine 118 obtains hierarchical data. For example, the model engine 118 can obtain a hierarchical structure 122 from the model data 120. In some implementations, the user data 114 includes a reference to data stored in the model data 120. For example, the user data 114 can include a reference to an international standard for process management. The model engine 118 can parse the user data 114 and identify the reference. The model engine 118 can query a database (e.g., in storage memory of the control unit 110 or memory of an external device, such as a server) storing the model data 120.

In some implementations, the model engine 118 obtains template data from the user data 114. In some implementations, the template data is organized according to international standard (ISO) hierarchical levels. For example, the template data can include one or more rows each corresponding to an ISO hierarchy level. Columns can include one or more of the following: ISO standard name, Template Mnemonics corresponding to a derived hierarchy followed by an organization, Description, Level, Parent Template, Taxonomy Source, among others.

The model engine 118 generates a model. The model can be used to generate a digital representation of one or more real world elements or entities. In an example model generation process, the model engine 118 can perform one or more processes including: initializing an object (e.g., a JSON Object with an array), extracting data from the user data 114 (e.g., organization_mnemonic and version), validating the data format and naming convention, generating a model storing common properties and relationships common across one or more models (e.g., DisplayName and Description).

In some implementations, validating the data format and naming convention can include comparing input data to a schema. The schema can indicate elements of the input data that are required. The schema can be represented as a JSON, CSV, among other file types. In general, data received (e.g., by the control unit 110) from asset or plants can be validated against a schema format. The control unit 110 can determine if received data does or does not match a format specified by a schema. If the control unit 110 determines received data does not match, the control unit 110 can discard the received data. In some implementations, received data that does not match the schema but matches a standard format (e.g., Open Systems Interconnection (OSI), asset framework hierarchy, among others), is not discarded by the control unit 110 but is processed (e.g., directly or after conversion to a specific form) by the control unit 110. In some implementations, the schema includes one or more standard formats.

In some implementations, the model engine 118 performs one or more processes for one or more data elements (e.g., rows, columns, among others) of the user data 114. For example, the one or more processes can include: creating an object (e.g., JSON object digitalTwinModel), generating a hierarchy level parameter corresponding to a condition (e.g., level is not Null), determining if a parent model is empty, combining a generated object with a base model if a parent model is empty, combining a generated object with a parent model if the parent model is not empty, logging errors for one or more processes.

In some implementations, for each data element, the model engine 118 generates an identifier. For example, an identifier specifying an organization mnemonic, taxonomy source, hierarchy level, template mnemonics, version, among others. The model engine 118 can generate a display name using the identifier.

In some implementations, an identifier includes one or more elements each representative of a data element. An example identifier can include the characters, "ORG:AF:L1:Site;1" where ORG represents an organization mnemonic, AF represents an Asset Framework (data can be sourced from OSI PI Asset Framework (PI AF)), L1 represents a corresponding level (e.g., in an ISO 14224 Asset Hierarchy) Site represents a template mnemonic, and 1 represents a corresponding version of an operating system (e.g., version 1).

In some implementations, the model engine 118 generates a model output. The model output can be represented as a JSON file indicating one or more parameters and values corresponding to the parameters. The parameters can include identification, type, display name, context, extends, contents, among others. Associated values can include "dtmi:Organization:AF:L2:Area;1", "Interface", "L2:Area", among others.

In some implementations, the model engine 118 processes model output. For example, the model engine 118 can perform one or more operations on a JSON file generated by the model engine 118 indicating one or more parameters and values. The one or more operations can include: obtaining a model output (e.g., a two dimensional data structure with an entity corresponding to each row and parameters corresponding to each column), accessing one or more digital twin instance shells (e.g., raw input data in a particular form, such as CSV, JSON, among others) specified by the model output, determining if an attribute specified in attribute data is included in the model output, validating an element of the attribute data (e.g., validating a data type of an element of the attribute data, such as comparing a data type of sensor data and a data type of a digital twin), converting an element of the attribute data, modifying a digital twin model specified by the model output (e.g., modifying one or more parameters of the model output to include parameters of the attribute data). In some implementations, validating an element of the attribute data includes determining a data type of the sensor data and converting from one data type to another as needed. For example, this can include determining that the data type of the sensor data is float, a data type of a corresponding digital twin is a double, and converting the sensor data of type float to type double for inclusion in the digital twin.

In some implementations, the model engine 118 processes model output. For example, the model engine 118 can perform one or more operations on a JSON file generated by the model engine 118 indicating one or more parameters and values. The one or more operations can include: obtaining a model output (e.g., a two dimensional data structure with an entity corresponding to each row and parameters corresponding to each column), accessing one or more digital twin instance shells specified by the model output, determining if a relationship specified in relationship data is included in the model output, modifying a digital twin model specified by the model output (e.g., modifying one or more parameters of the model output to include parameters of the relationship data).

In some implementations, the control unit 110 uploads model output. For example, the control unit 110 can upload model output generated by the model engine 118. The control unit 110 can upload model output to one or more devices communicably connected to the control unit 110, e.g., a server, a database, among others. In some implementations, the control unit 110 uploads model output to an Azure Digital Twin (ADT). The ADT can be provided by AZURE MICROSOFT™. The ADT can use a Digital Twin Definition language (DTDL) to define models and relationships. The DTDL can include one or more files in a JSON-LD format.

In some implementations, the model engine 118 generates a digital representation using generated model output. For example, the model engine 118 can generate model output and then generate a digital representation, such as a digital twin, using the generated model output. In some implementations, the digital twin is used to convert non-standard data received from one or more sending elements. For example, the manufacturing process data 108 can be converted using a model, such as a digital twin, to enable querying and response using the semantic relationships provided by the model.

In some implementations, the model engine 118 generates the model 124 as a digital representation for one or more of the manufacturing plants 102, 104, and 106. For example, the user data 114 can include information representing the manufacturing plants 102, 104, and 106. The model engine 118 can generate the model 124 as a digital representation of the manufacturing plants 102, 104, and 106 using the user data 114. The digital representation, or digital twin, can be used by a standardization engine 126 to convert the manufacturing process data 108.

The receiving module 116 of the control unit 110 obtains the manufacturing process data 108 from one or more manufacturing plants (e.g., plants 102, 104, and 106). Although three plants are shown, any number of plants, properties, or organizations can provide data to the control unit 110. The manufacturing process data 108 can be sent using a wired or wireless communication. The receiving module 116 can include an interface to obtain the manufacturing process data 108.

The receiving module 116 can provide the manufacturing process data 108 to the standardization engine 126. The standardization engine 126 can obtain the manufacturing process data 108 and the model 124 generated by the model engine 118. The standardization engine 126 can use the model 124 to convert the manufacturing process data 108 that can be in a non-standard format to a standard format corresponding to the model 124.

In some implementations, the manufacturing process data 108 is in a non-standard format. For example, one or more entities of the plants 102, 104, and 106 (e.g., 102a, 102d, 106a, among others) can generate processing data and provide the processing data to the control unit 110. The processing data can be represented in any suitable format. In some cases, one or more entities can provide processing data to a plant control unit. The plant control unit can aggregate processing data and provide the processing data to the control unit 110.

In some implementations, the system can include an edge device that obtains data from assets and provides data from the assets to the control unit 110. For example, an edge device 107 can obtain data from the entities 106a and 106b. The edge device 107 can be communicably connected to the control unit 110 and the entities 106a and 106b. In some implementations, having a single point of contact for a plant can reduce time in setting up networks of connected components. In some implementations, having a single point of contact for a plant reduces processing requirements for the control unit 110. For example, the edge device 107 can perform one or more pre-processing steps to prepare data obtained by the entities 106a and 106b for processing by the control unit 110. In some implementations, the edge device 107 can perform one or more processes discussed in regard to the control unit 110. For example, the edge device 107 can perform one or more operations of the standardization engine 126, the receiving module 116, among others.

In some implementations, the standardization engine 126 contextualizes the manufacturing process data 108. For example, the standardization engine 126 can connect one or more elements of the manufacturing process data 108 using a MPAG. In some implementations, the model 124 includes a MPAG. In some implementations, the standardization engine 126 generates a MPAG using the model 124.

In some implementations, the standardization engine 126 performs one or more operations to convert the manufacturing process data 108. For example, the one or more operations can include: accessing a model graph (e.g., the model 124) that represents a graph model MPAG; reading raw data Rn (e.g., manufacturing process data 108) and iterate through each element (e.g., row, column); generating a source path or generic parent path; querying a MPAG.

In some implementations, generating a source path or generic parent path helps to map data that is not mapped to industry standard formats (e.g., process assets (telemetry) data) for root cause analysis. For example, some data sources (e.g., purchase order data, bill of materials, downtime events, maintenance records, among others) may not be mapped to the corresponding industry standard formats like other process asset data, such as telemetry data. These additional data can be mapped by the control unit 110 to provide a complete view of a given system, which may be important for root cause analysis in some implementations.

Data which is either not mapped or partially mapped to represent their industrial standard taxonomy can be tagged, e.g., by the control unit 110 by recorded row, to represent which level of taxonomy it belongs to. The tagging can be referred to as a generic path. The data can be tagged to represent a hierarchy using a parent generic path. Mapping in this way helps contextualize data and provides additional data for a digital representation, such as a digital twin instance. Using these new parameters (e.g., generic path, parent generic path, among others), a user can query the MPAG to find out if a node corresponding to the data already exists, or if a new node needs to be created. If a new node needs to be created, the control unit 110 can create a new node with a parent generic path. If a node corresponding to the data already exists, then the control unit 110 can locate the node using one or more parameters (e.g., generic path, parent generic path, among others) and update one or more editable properties of the node.

An example of a parent generic path is the following: "Plant\Area\Process_X\Subprocess_X1." An example of a generic path is the following: "Plant\Area\Process_X\Subprocess_X1\Asset_X1."

The parent generic path and the generic path can represent a data node's hierarchical level in the MPAG and with these paths, an existing data node can be identified and all properties of the node, such as raw data (e.g., actual values of properties obtained from connected systems, manufacturing plants, among others), can be updated in the node. If a query does not return any result using the generic path then the control unit 110 can generate a new data node using a parent generic path along with properties of the node, such as raw data. When the control unit 110 obtains raw data associated with a particular generic path, the control unit 110 can update the node corresponding to the generic path.

In some implementations, generating a source path or generic parent path includes: fetching a file name Fn of raw data (e.g., manufacturing process data 108) to get a data source name; generating a source path using raw data Rn; iterating through each element of the raw data; creating a new element (e.g., row) generic path by concatenating two or more elements (e.g., columns) (e.g., column representing plant, column representing area, column representing process, column representing sub-process) and a file name Fn. An example path for each row can be represented, with Rn[y] representing a yth row and "\" representing a concatenation: Rn[x]=Rn[0]\ Rn[1]\ Rn[2]\ Rn[3]\ Fn.

In some implementations, querying a MPAG includes: for each element of raw data, accessing Rn[x] (e.g., an xth element in the raw data) for source path; accessing MPAG; writing a query in MPAG finding a graph node with a generic path matching Rn[x]; determining if a generic path Rn[x] exists in MPAG; if exists, a resultant node is a MPAG node that has basic properties like taxonomy level, parent path, among others; if generic path does not exist, querying MPAG finding a graph node with generic parent path equals Rn[y]; if a generic path is found, a resultant MPAG node, updating a latest known property with a latest value from raw data Rn to a resultant MPAG node; if a generic parent path is found, to a resultant MPAG node which is a parent node, creating a new instance of a digital twin and add basic attributes (e.g., taxonomy source, level) and add a latest known property with a latest value from raw data Rn to the resultant MPAG node.

In some implementations, the standardization engine 126 contextualizes the manufacturing process data 108. For example, the manufacturing process data 108 can be converted from a non-standard format to a format of a digital twin or MPAG. The digital twin or MPAG can be a working memory for data obtained from one or more systems (e.g., the plants 102, 104, and 106). Parameter and property values can be updated corresponding to new data obtained from the one or more systems and relationships between entities can be used to handle queries and provide data to users representing a current status or forecast for the one or more systems. Combining MPAG and contextualized data enable performing analytics at scale.

Using a contextualized version of the manufacturing process data 108, the control unit 110 can represent entities and relationships between entities. Relationships between entities can be time relevant (e.g., a process performed by a manufacturing asset precedes a process performed by another asset, such that errors from the preceding asset will affect the following asset). The control unit 110 can use such contextualization to solve many problems in real time, as this holistic view defines an entire system view (e.g., a system view of an organization), at a time, when an event is happening.

The control unit 110 can generate a graphical path, such as a MPAG, for any problems that occur at any contextualized digital twin. For example, a process or sub-process can be monitored in terms of one or more key performance indicators (KPI) values and if one or more KPI values satisfy a threshold, the control unit 110 analyzes an entire set of contributing factors. The factors can include different sets of process or sub-processes and might be very far (e.g., in time or space) from a current impacted process. The control unit 110 can traverse a MPAG digital twin to fetch related entities and contributing factors to analyze the problem and reach a root cause efficiently.

An entire system can be defined with a standardized model and data points from different sources (e.g., obtained in a non-standardized form). The model, e.g., contextualized data in a MPAG, aids the control unit 110 in determining each factor impacting a deviation from a target or goal value. The control unit 110 can generate an analysis report or adjust elements of a system (e.g., sending a signal to an asset where the signal is configured to modify operation of the asset to correct a deviation contributed to by the asset) using one or more factors determined by the control unit 110 to be contributing to a deviation. Signals sent by the control unit 110 can be sent using the transmitting module 134. Signals can include RF signals.

In some implementations, the control unit 110 determines a capacity of an asset operating functionally. For example, an asset can be configured to operate at a specific throughput. Under normal conditions, the asset can achieve the specific throughput. In some conditions, the asset may not achieve the specific throughput. Using the data obtained from one or more plants or assets, the control unit 110 can determine a state of operation of an asset, e.g., predicting a drop in throughput, downtime, or increased efficiency due to changes to the asset, upstream processes, among others.

In some implementations, the control unit 110 determines a replacement strategy for one or more assets. For example, the control unit 110 can determine an asset is reaching end of life use or needs repair. The control unit 110 can make such determinations, for example, using manufacturing process data 108. The control unit 110 can generate a strategy for repairing one or more assets and provide the strategy to one or more devices. The control unit 110 can automatically request repair service using data from the manufacturing process data 108. For example, the control unit 110 can provide information to a repair service and provide details of a time for repair and an asset to be repaired.

In some implementations, the control unit 110 provides purchase order requests automatically at specific dates. In general, the control unit 110 can obtain telemetry process data (e.g., manufacturing process data 108). The control unit 110 can determine, based on process data, an expected throughput of a manufacturing system. The expected throughput can account for expected downtime of one or more assets or scheduled repairs. The control unit 110 can determine, using the expected throughput of a manufacturing system, quantities of one or more items to purchase where the items are to be processed by the manufacturing system.

In some implementations, the control unit 110 adjusts a time of events in incoming data. For example, the control unit 110 can determine a process delay (e.g., for a source or destination). The process delay can include a first asset generating an item which takes a specific amount of time. The destination delay can include a time within which the item moves or progresses to another entity, e.g., asset, process, sub-process. The control unit 110 can perform time series adjustment of incoming data using a Manufacturing Plant Analytics Graph. For example, the control unit 110 can align or shift contributing factors (CFs), which contribute to a specific KPI wherever they are in a process hierarchy, when the KPI satisfies a threshold. This can help identify root causes more efficiently than time adjusting after KPIs have satisfied a threshold.

In some implementations, the control unit 110 maintains all raw data (e.g., in internal memory or memory in a connected device). For example, data can be maintained in a MPAG preserving a contextualized view of a system to enable effective monitoring of processes and contributing factors. Relationships can be stored in the MPAG. Relationships can include information related to source, destination, delay, material flow, among others.

The control unit 110 can generate a MPAG for any use case in a manufacturing plant. The MPAG can be used to identify root causes of problems identified by monitoring one or more KPIs. For example, a MPAG generated by the control unit 110 can include a representation of a source process and material being prepared for a destination process. The source process can include pasteurizing milk and sending the pasteurized milk to a destination process, such as bottling. One or more metrics can be provided by entities corresponding to a destination process. One or more KPIs monitored by a system can satisfy a warning threshold.

The control unit 110 can obtain KPI values in the manufacturing process data 108. The control unit 110 can identify the KPI values corresponding to the destination process and identify upstream processes based on relationships of the MPAG to identify the source process as a contributing factor. In some implementations, the control unit 110 identifies KPIs for the source process to determine if preceding contributing factors are responsible for the source process errors or if the root cause is the source process.

The control unit 110 obtains query 128 from the device 127. The device 127, similar to the device 112, can be a portable computer. In some implementations, the device 127 and the device 112 are the same device. The device 127 includes one or more transmitting elements configured to transmit data. The device 127 can be configured to transmit data through a wired or wireless connection to the control unit 110. The receiving module 116 of the control unit 110 obtains the query 128 generated and sent by the device 127.

The control unit 110 obtains the query 128 and uses the contextualized manufacturing process data 108 to generate the response 136. In the example of FIG. 1, the query 128 asks for a root cause for a problem identified at the plant 104. It will be appreciated by one skilled in the art that other queries can be processed and responded to by the control unit 110.

The query response engine 130 of the control unit 110 obtains the query 128 from the receiving module 116. The query response engine 130 of the control unit 110 generates the response 136. The query response engine 130 can perform one or more operations to generate the response 136. The one or more operations can include time adjustment of one or more time series as described herein. The one or more operations can include: finding one or more entities (e.g., assets) in one or more levels of a MPAG; analyzing one or more metrics (e.g., critical, warning) of a MPAG corresponding to one or more entities; identifying one or more metrics (e.g., quality, downtime, among others) associated with a specific entity or type of entity for one or more systems (e.g., manufacturing plants, such as plant 104); performing time series adjustment by monitoring one or more thresholds, calculation factors, event, process graph, lagged parameters, contributing factors, among others.

In some implementations, the query response engine 130 of the control unit 110 performs one or more operations to generate the response 136. For example, the one or more operations can include parsing a MPAG to obtain information. The information can include: finding one or more digital twin nodes of a particular model type; identifying one or more relationships of interest (e.g., material_flow or hasMetric or has Alert); determining if one or more values representing a relationship of interest (e.g., metric, alert, among others) satisfies a threshold (e.g., if there is any metric which has crossed warning or critical levels of threshold then the control unit 110 can attach an alert node of type Amber or Critical respectively to the metric; determining contributing factors for one or more nodes of a MPAG (e.g., assets with alerts, parent processes, previous processes, processing time for the previous process or the current process, properties of a relationship, such as a material id of a produced element (e.g., milk) or the time it takes to flow from a first process to a second process).

The one or more operations can include using obtained information from the MPAG to calculate KP Is for a current or previous process. Calculating KP Is for a current or previous process can include: querying downtime event data to detect an increase or decrease in metric value in a time series db; recording a timestamp when a metric is not normal (e.g., above or below normal value) and a previous timestamp when metric was normal; analyzing asset properties associated with the metrics of the two timestamps; analyze asset properties during a same timestamp (noted above) when a downtime event went higher than normal; generating an event process graph using calculation factors, lagged parameters, contributing factors (e.g., CF1, CF2 and CF3) and adjust a time series alignment.

In some implementations, the query response engine 130 of the control unit 110 identifies one or more contributing factors. For example, the control unit 110 can identify an asset that satisfies a threshold condition (e.g., throughput is below a minimum throughput level). The control unit 110 can identify processes prior to the asset (e.g., processes that are executed at locations upstream from the asset). The control unit 110 can determine, using data from one or more processes or assets prior to the asset, processes or assets that satisfy one or more thresholds. For example, a first process that satisfies one or more threshold conditions prior to a second process satisfying one or more threshold conditions can be identified by the control unit 110 as a contributing factor of the second process.

In some implementations, the control unit 110 records a time lag for each process. For example, the control unit 110 can maintain a digital twin model of a manufacturing process. The digital twin can be stored in an event process graph. Each process of the event process graph can have an associated time lag indicating an amount of time between two or more processes.

In some implementations, an event process graph is generated by bringing all contributing factors within a current process's time frame. For example, the control unit 110 can determine that a KPI (e.g., moisture content of the manufactured product) has satisfied one or more threshold conditions (e.g., has crossed a threshold value). The KPI can be a result of factors within the current process and factors in upstream processes (e.g., processes taking place prior to the current process). A typical manual process of performing root cause analysis by a user is time consuming and prone to errors. In some cases (e.g., if no user is available), causes can go undiagnosed. In some implementations of the technology described herein, to perform a root cause analysis, the control unit 110 can account for multiple relevant factors (the quantity and complexity of which can make manual processing infeasible). The control unit 110 can use a MPAG with relationships configured by the control unit 110 to identify previous processes. The MPAG can include relationship properties, such as 'transfer delay.' Using the relationships and transfer delays, the control unit 110 can determine a time lag between a first process and any other process (e.g., a previous or subsequent process). The control unit 110 can configure contributing factors using time delays for one or more processes and can realign the contributing factors on a time frame of a current process to help improve efficiency of root cause analysis (e.g., pre-processing time adjustments to enable quick problem diagnostics).

In some implementations, the control unit 110 computes a time stamp for a contributing factor. For example, the control unit 110 can compute a difference between an alert time corresponding to a KPI (e.g., a time corresponding to a KPI satisfying a threshold) and a time lag (e.g., a total of transfer delay between a first process and a process of a contributing factor). In some implementations, the control unit 110 can generate a table that includes one or more of a time stamp for a contributing factor, a time lag, or values of a contributing factor (e.g., identifier, thresholds, location, among others).

In some implementations, the control unit 110 provides instructions to a display configured to show information. For example, the control unit 110 can provide instructions configured to show a visualization of one or more contributing factors on a common time frame starting when a KPI alert was generated. The control unit 110 can determine a common time frame using one or more elements of the MPAG as described.

The one or more operations can include generating new data using a MPAG. For example, the control unit 110 can record data, such as the manufacturing process data 108, and input the data into a MPAG. This enables different kinds of problem solving using optimal graphs queries (e.g., querying all nodes which have Alerts of a Red type).

In some implementations, process parameters can be associated with one or more threshold conditions. For example, a process can have a threshold throughput of 190 to 220 (e.g., items per hour). If, using the manufacturing process data 108, the control unit 110 determines the throughput is 245 (e.g., items per hour), the control unit 110 can generate an alert, for example, using a newly generated digital twin corresponding to the alert (e.g., a digital twin corresponding to processes that contribute to the process that satisfies one or more threshold conditions).

In some implementations, a node is dynamically associated with any process that satisfies one or more threshold conditions. Using a MPAG, the control unit 110 can query and determine any existing critical alerts associated with any process or asset in a system. The control unit 110 can also be configured to take action on any open alerts. Actions can include, for example, providing a notification to a device or performing one or more automated actions, such as controlling an asset or process to stop or perform one or more actions specified in a signal sent by the control unit 110. After an issue is addressed or otherwise alleviated, the control unit 110 can update one or more digital twins to reflect that the one or more threshold conditions for the alert are no longer being satisfied. In some implementations, the control unit 110 can dynamically remove one or more alert nodes from any associated asset/process after the asset/process returns to normal operating conditions.

In some implementations, the control unit 110 provides data to a data explorer, such as AZURE DATA EXPLORER™. The data explorer can be used to visualize an outcome of processing user data 114 and the manufacturing process data 108. The data explorer can be used to visualize a MPAG representing one or more portions of the user data 114 or the manufacturing process data 108. The control unit 110 can generate visualization features for a data explorer representing contributing factors. The control unit 110 can identify contributing factors using one or more MPAG generated by the control unit 110.

The control unit 110 provides the response 136 to the device 127. In some implementations, the response 136 includes KPIs generated by the control unit 110. In some implementations, the response 136 includes a representation of a MPAG. In some implementations, the response 136 includes one or more root causes. In some implementations, the transmitting module 134 of the control unit 110 transmits the response 136 as an RF signal to the device 127 over a wireless network. In some implementations, the transmitting module 134 of the control unit 110 transmits the response 136 as one or more pulses of electricity to the device 127 over a wired network. In some implementations, the control unit 110 generates the response 136. For example, the control unit 110 can configure the response 136 to cause a display of the device 127 to display a visualization of data corresponding to the manufacturing process data 108 (e.g., a MPAG, KPIs, root causes, among others).

In some implementations, the control unit 110 operates a feed forward loop. For example, the control unit 110 can use a MPAG to preempt an issue and control a device by issuing a signal. The device can control one or more processes or assets. The control unit 110 can predict one or more future conditions using current data (e.g., the manufacturing process data 108), and accordingly, send a signal to an asset or device associated with a corresponding process. The signal can be configured to adjust an operation, stop an operation, trigger an alert, among others. in some implementations, the signal can be configured to actuate one or more actuators.

In some implementations, the control unit 110 operates in accordance with one or more machine learning models trained to predict one or more system issues using historical data. For example, the control unit 110 can provide historical data to the one or more machine learning models where the historical data represents operation data from one or more assets or entities (e.g., the manufacturing process data 108). The one or more machine learning models can be trained using the historical data to predict a future error or issue associated with one or more assets or entities. The control unit 110 can compare the prediction to ground truth data representing actual errors or issues that occurred following the historical data used as input to the one or more machine learning models.

In some implementations, the control unit 110 unifies data from different systems. For example, the control unit 110 can obtain the manufacturing process data 108, convert the manufacturing process data 108, and stores the converted manufacturing process data 108 in a MPAG. The control unit 110 can generate a visualization to view one or more systems within one single visualization window. Latest known data can be statically present as properties or dynamically ingested in the form of telemetry updates (e.g., manufacturing process data 108 obtained from manufacturing plants). The control unit 110 can use the relationships of the manufacturing process data 108 to solve one or more problems, such as problems represented as queries provided by users using an input interface to the control unit 110.

In some implementations, the model engine 118 performs one or more operations to generate a digital representation using generated model output. For example, the model engine 118 can parse generated model output (e.g., JSON, XML, or CSV listing one or more real world entities within a site, plant, organization, manufacturing line, among others). For each entity represented in the generated model output, the model engine 118 can perform one or more operations. For example, the model engine 118 can determine if a unique identification is provided in the generated model output for each entity.

If a unique identification is provided for a given entity, the model engine 118 can perform one or more subsequent operations. For example, the model engine 118 can check if the given entity already exists within a MPAG of a digital twin as twin node. In some cases, the model engine 118 can perform one or more subsequent operations if a unique identification is not provided for a given entity. For example, the model engine 118 can generate a unique identifier. The model engine 118 can perform a property matching to check for twin existence.

In some implementations, data of the manufacturing process data 108 has no unique identifier. Data without a unique identifier can be verified by the control unit 110 using properties like generic path and Generic Parent Path. If the control unit 110 determines that no path of the data matches an existing path in a twin graph, the data can be considered new. The control unit 110 can generate a new node in a twin graph for the data with the unique identifier. The control unit 110 can generate a new unique identifier. The control unit 110 can generate a new unique identifier using one or more properties of the data obtained from the manufacturing process data 108. The new unique identifier can then help the control unit 110 perform subsequent operations or query faster in a twin graph.

In some implementations, the model engine 118 parses the generated model output for specific data. For example, the model engine 118 can parse the generated model output for an entity type (e.g., site, plant, process, asset, among others). The model engine 118 can identify a type for each entity and select a model based on the entity type. The selected model can be added to a digital twin. For example, the control unit 110 can store one or more models, including a model for an asset entity. The model can include parameters or values specific for representing an asset digitally. The model engine 118 of the control unit 110 can select the model for the asset entity for each identified asset in the generated model output. The model engine 118 can include each of those asset models in a digital twin to digitally represent real world assets.

In some implementations, the standardization engine 126 generates instances or twins using one or more of input data (e.g., the manufacturing process data 108) or model output generated by model engine 118. In some implementations, the model engine 118 generates types (e.g. a motor can be associated with a particular type based on properties like revolutions per minute (RPM), location, among others). In some implementations, the standardization engine 126 generates a specific instance of that motor (e.g., MotorA001). For example, the standardization engine 126 can generate a motor instance that is located in a second building, on a first floor, and has a RPM of 34000. The control unit 110 can obtain process data for the motor instance (e.g., the manufacturing process data 108) and updated a status of a digital instance of the motor to match a real instance of the motor.

In some implementations, asset data includes a list of actual assets, processes, subprocesses, and KPIs. Asset data can include corresponding values. A given organization can include one or more asset types (e.g., a motor) which are generated by the control unit 110 in a digital model.

In some implementations, template data includes taxonomy information. For example, template data can include information related to international data collection and maintenance management standards (e.g., International Standardization Organization (ISO) 14224, among others). The template data can include standards for collection of data for the management or maintenance of equipment including reliability data. The template data can include levels within a hierarchical structure (e.g., L1 to L9 of the ISO 14224 standards).

In some implementations, template data includes names of assets, processes, or other entities. Template data can include data indicating an entity's corresponding level within a standard (e.g., L1, L3, among others). Template data can include additional information (e.g., use or location, equipment information, among others). Template data can include one or more parameters stored in any suitable format (e.g., template name, base template, attributes, attribute name, data type, relationships, supported characters, among others).

Template name can include one or more characters from a digital representation service, e.g., a digital twin service. One or more rules can be configured by the control unit 110. The control unit 110 can verify ingested input and generate error logs if rules are not followed by a given input. For example, a template name can start with a letter (e.g., in case of an ADT). Characters within a name can be alphanumeric or can have underscore. In some implementations, a name must not end with an underscore.

A base template can specify a template name from which a current template is inheriting one or more properties. Attributes can include one or more properties of a given entity (e.g., manufacturer, running, not running, asset identification (ID), latitude, longitude, location, time zone, among others).

In some implementations, attributes include attribute names or data types. For example, an attribute name can include one or more characters used in a digital representation. A data type can match a standard data type. If the data type does not match the standard data type, the control unit 110 can convert one or more elements to one or more other elements (e.g., integer to float, string to float, among others).

In some implementations, attribute data includes one or more attributes, e.g., for an entity. For example, attribute data can include an attribute for a first entity (e.g., a pressurized wash asset, washing process, washing movement sub-process, among others). Examples attributes can include one or more values representing: manufacturer, running, not running, asset ID, latitude, longitude, location, or time zone, among others.

In some implementations, template data includes relationship data. For example, the relationship data can include an indication of two or more real world entities and how the two or more real world entities relate to one another. For example, a first asset in a manufacturing line can perform a first process and precede a second asset. The first asset can perform some preparatory operation in the first process and the second asset performs a subsequent process while manufacturing products. The relationship data can include an indication that the first process is performed by the first asset and the second asset and related processes occur after the first process. In this way, real world processes, such as manufacturing, can be digitally represented. Such a representation can be referred to as a digital twin.

In some implementations, relationship describes parameters of a relationship between a source and a target. For example, a relationship can include material flow details like material identification, name, and corresponding measurable units. Relationship data can include properties of a relationship between entities or assets. Properties can include time lag for material flow, measurable units (e.g., RPM, throughput, operational status, among others).

In some implementations, relationship data corresponds to a relationship format. In general, relationship data can include one or more values representing a relationship between a source and a target. In some implementations, no source or target information is included in the relationship data. In some implementations, a relationship format includes a source template parameter, target template parameter, and a relationship name parameter. One or more of the parameters can be defined using alphanumeric characters in the user data 114.

Figure 2:
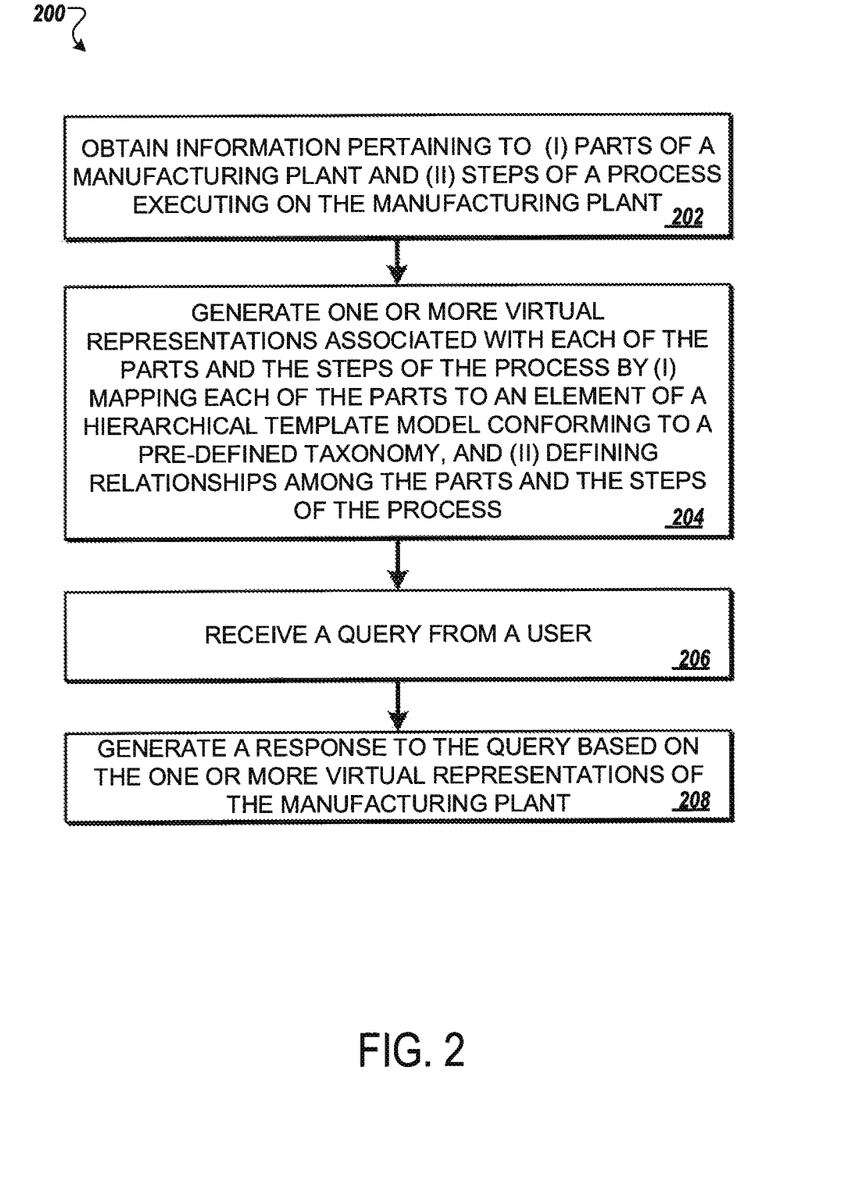
FIG. 2 and FIG. 3 are flowcharts illustrating examples of processes for system contextualization.

FIG. 2 is a flowchart illustrating an example of a process 200 for system contextualization. The process 200 may be performed by one or more electronic systems, for example, the system 100 of FIG. 1.

The process 200 includes obtaining information pertaining to (i) parts of a manufacturing plant and (ii) steps of a process executing on the manufacturing plant (202). For example, the control unit 110 obtains the user data 114 and the manufacturing process data 108. The control unit 110 generates a model 124 using the user data 114. The control unit 110 converts the manufacturing process data 108 from one or more units of the plants 102, 104, and 106 using the model 124 to a standard format. The control unit 110 generates responses, such as response 136, to queries using the converted manufacturing data.

The process 200 includes generating one or more virtual representations associated with each of the parts and the steps of the process by (i) mapping each of the parts to an element of a hierarchical template model conforming to a pre-defined taxonomy, and (ii) defining relationships among the parts and the steps of the process (204). For example, the control unit 110 can generate the model 124 representing a digital twin of one or more manufacturing processes, e.g., processes occurring at plant 1, plant 2, or plant N as shown in FIG. 1. In some implementations, virtual representations include one or more base models.

The process 200 includes receiving a query from a user, the query being in conformation with the format of the hierarchical template model (206). For example, the control unit 110 can obtain the query 128 from the device 127.

The process 200 includes generating a response to the query based on the one or more virtual representations of the manufacturing plant (208). For example, the control unit 110 can obtain the query 128 and use the contextualized manufacturing process data 108 to generate the response 136.

Figure 3:
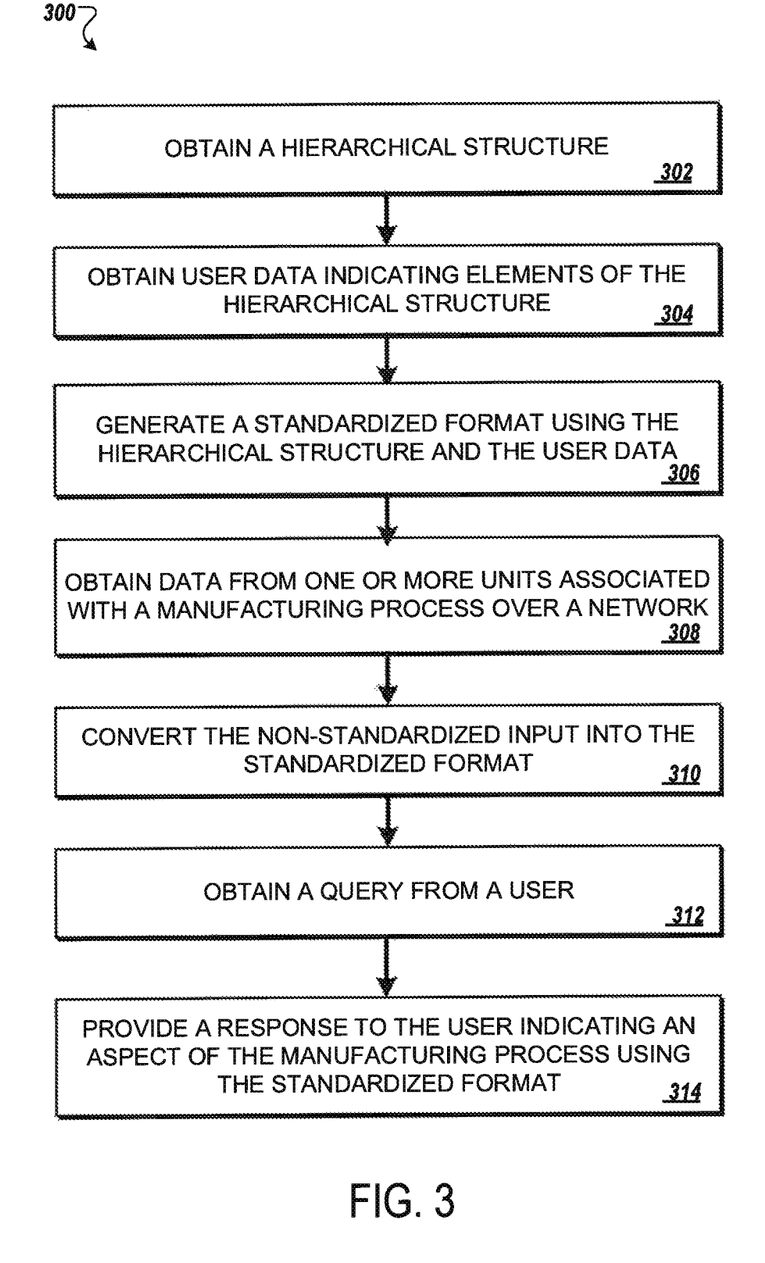

FIG. 3 is a flowchart illustrating an example of a process 300 for system contextualization. The process 300 may be performed by one or more electronic systems, for example, the system 100 of FIG. 1.

The process 300 includes obtaining a hierarchical structure (302). For example, the control unit 110 can obtain the hierarchical structure 122 from the model data 120.

The process 300 includes obtaining user data indicating elements of the hierarchical structure (304). For example, the control unit 110 can obtain the user data 114. In some implementations, the user data 114 indicates a hierarchical structure, e.g., the hierarchical structure 122.

The process 300 includes generating a standardized format using the hierarchical structure and the user data (306). For example, the control unit 110 can generate the model 124. The model 124 can represent one or more elements of the plant 1, plant 2, or plant N in a standardized format.

The process 300 includes obtaining data from one or more units associated with a manufacturing process over a network (308). For example, the control unit 110 can obtain the manufacturing process data 108. The data can be in a non-standardized format dependent on the hardware and software platform used by the one or more units. The control unit 110 can obtain the data 108 from entities of a process or edge devices communicably connected to the entities.

The process 300 includes converting the non-standardized input into the standardized format (310). For example, the control unit 110 can use the model 124 to standardize the manufacturing process data 108. The control unit 110 can update one or more values represented in the model 124 using the manufacturing process data 108. In some implementations, values formatted to be converted from a non-standardized format into a standardized format are logged.

The process 300 includes obtaining a query from a user (312). For example, the control unit 110 can obtain the query 128 from the device 127. In some implementations, the query 128 asks for a root cause for a problem identified at a given plant (e.g., the plant 104).

The process 300 includes providing a response to the user indicating an aspect of the manufacturing process using the standardized format (314). For example, the control unit 110 can obtain the query 128 and use the contextualized manufacturing process data 108 to generate the response 136.

Although techniques and systems are described in regard to a manufacturing system, one skilled in the art will recognize the techniques and systems can be applied to other fields (e.g., programming files, project planning, among others).

Figure 4:
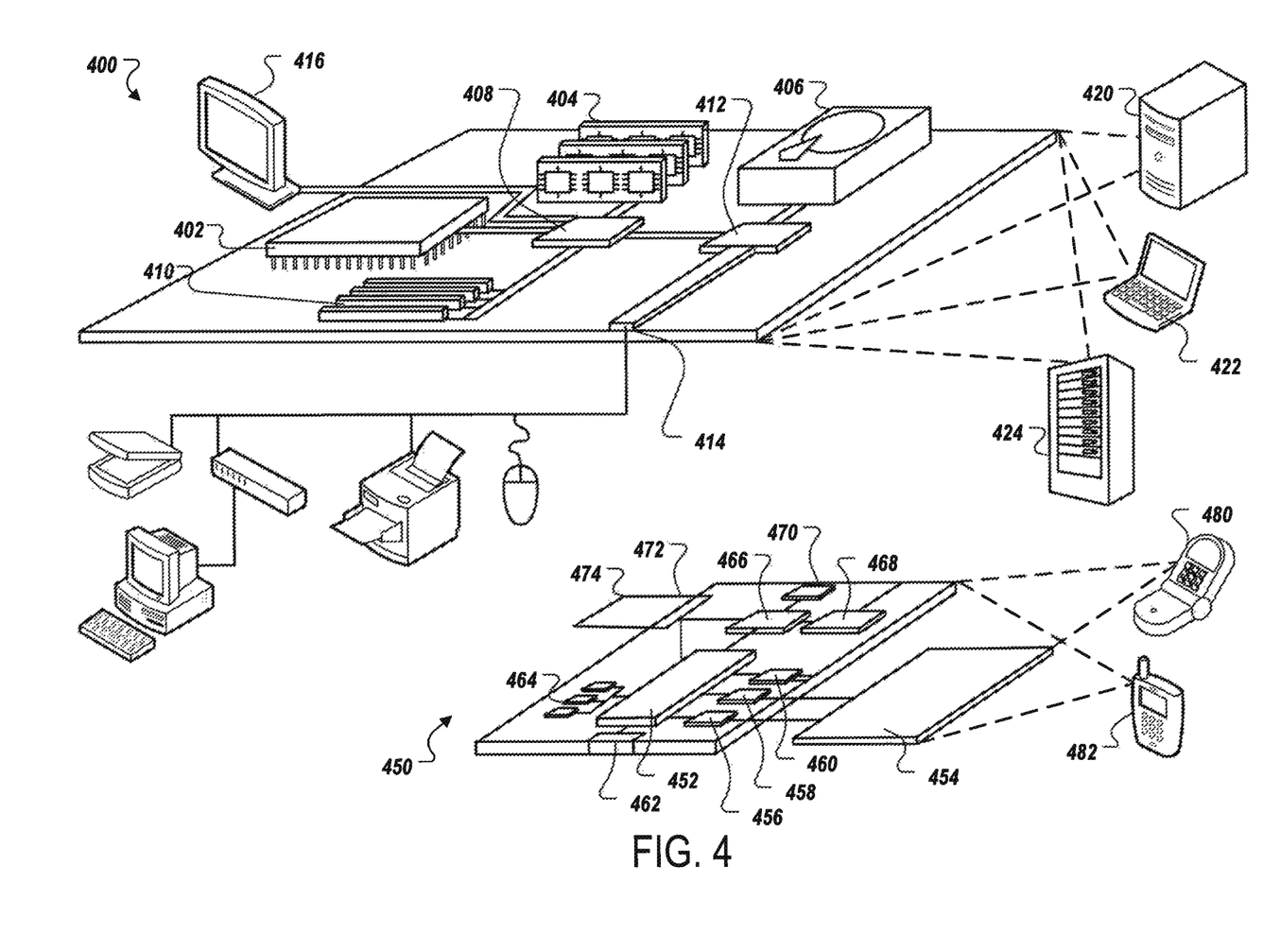
FIG. 4 is a diagram illustrating an example of a computing system used for system contextualization.

FIG. 4 is a diagram illustrating an example of a computing system used for system contextualization. The computing system includes computing device 400 and a mobile computing device 450 that can be used to implement the techniques described herein. For example, one or more components of the system 100 could be an example of the computing device 400 or the mobile computing device 450, such as a computer system implementing the control unit 110, devices that access information from the control unit 110, or a server that accesses or stores information regarding the operations performed by the control unit 110.

The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 402 is a single threaded processor. In some implementations, the processor 402 is a multi-threaded processor. In some implementations, the processor 402 is a quantum computer.

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine readable mediums (for example, the memory 404, the storage device 406, or memory on the processor 402). The high-speed interface 408 manages bandwidth-intensive operations for the computing device 400, while the low-speed interface 412 manages lower bandwidth-intensive operations. Such allocation of functions is an example only. In some implementations, the high speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may include one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry in some cases. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 468 using a radio frequency. In addition, short-range communication may occur, such as using a Bluetooth, Wi-Fi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, among others) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method for managing operations of a manufacturing plant comprising:
   obtaining information pertaining to parts of the manufacturing plant and steps of a process executing on the manufacturing plant;
   generating a model by:
   initializing an object associated with the parts and the steps of the process;
   extracting data from the obtained information associated with the parts and the steps of the process;
   validating the extracted data to ensure proper data format and naming conventions; and
   generating the model to store common properties and the relationships between the parts and the steps of the process;
   generating one or more virtual representations associated with each of the parts and the steps of the process based on the model by mapping each of the parts to an element of the hierarchical template model conforming to a pre-defined taxonomy, and defining relationships among the parts and the steps of the process;
   receiving at least one alert indicating that a metric associated with a particular part of the manufacturing plant satisfies a first predetermined condition;
   identifying a second virtual representation that is connected to a first virtual representation of the particular part as defined by the relationships among the parts and the steps of the process, where the second virtual representation reflects a status or metric related to the performance or condition of the part or process step;
   determining that a status or metric associated with the second virtual representation satisfies a second predetermined condition, the second predetermined condition is a threshold indicating a potential issue or deviation from normal operation;
   responsive to determining that the status or metric associated with the second virtual representation satisfies the second predetermined condition, identifying the status or metric as a root cause associated with the at least one alert;
   adjusting operation of at least one of the parts based on the root cause;
   receiving a query from a user, the query being in conformation with the format of the hierarchical template model; and
   generating a response to the query based on the one or more virtual representations of the manufacturing plant.

2. The method of claim 1, further comprising:
   receiving run-time data pertaining to one or more metrics associated with at least one particular part of the manufacturing plant;
   updating a status of a corresponding virtual representation associated with the particular part; and
   updating a status of each of one or more virtual representations connected to the particular part as defined by the relationships among the parts and the steps of the process.

3. The method of claim 1, wherein the second virtual representation is directly connected to the first virtual representation.

4. The method of claim 1, wherein the second virtual representation is connected to the first virtual representation through at least a third virtual representation.

5. The method of claim 1, wherein the virtual representations and interrelationships thereof are represented as a directed graph.

6. The method of claim 1, wherein mapping each of the parts to an element of the hierarchical template model conforming to the pre-defined taxonomy comprises:
   converting non-standardized input of the information into a standardized format.

7. A non-transitory computer-readable medium storing one or more instructions executable by a computer system to perform operations of a manufacturing plant comprising:
   obtaining information pertaining to parts of the manufacturing plant and steps of a process executing on the manufacturing plant;
   generating a model by:
   initializing an object associated with the parts and the steps of the process;
   extracting data from the obtained information associated with the parts and the steps of the process;
   validating the extracted data to ensure proper data format and naming conventions; and
   generating the model to store common properties and the relationships between the parts and the steps of the process;
   generating one or more virtual representations associated with each of the parts and the steps of the process based on the model by mapping each of the parts to an element of the hierarchical template model conforming to a pre-defined taxonomy, and defining relationships among the parts and the steps of the process;
   receiving at least one alert indicating that a metric associated with a particular part of the manufacturing plant satisfies a first predetermined condition;
   identifying a second virtual representation that is connected to a first virtual representation of the particular part as defined by the relationships among the parts and the steps of the process, where the second virtual representation reflects a status or metric related to the performance or condition of the part or process step;

determining that a status or metric associated with the second virtual representation satisfies a second predetermined condition, the second predetermined condition is a threshold indicating a potential issue or deviation from normal operation;

responsive to determining that the status or metric associated with the second virtual representation satisfies the second predetermined condition, identifying the status or metric as a root cause associated with the at least one alert;

adjusting operation of at least one of the parts based on the root cause;

receiving a query from a user, the query being in conformation with the format of the hierarchical template model; and generating a response to the query based on the one or more virtual representations of the manufacturing plant.

8. The medium of claim 7, wherein the operations comprise:

receiving run-time data pertaining to one or more metrics associated with at least one particular part of the manufacturing plant;

updating a status of a corresponding virtual representation associated with the particular part; and updating a status of each of one or more virtual representations connected to the particular part as defined by the relationships among the parts and the steps of the process.

9. The medium of claim 7, wherein the second virtual representation is directly connected to the first virtual representation.

10. The medium of claim 7, wherein the second virtual representation is connected to the first virtual representation through at least a third virtual representation.

11. The medium of claim 7, wherein the virtual representations and interrelationships thereof are represented as a directed graph.

12. The medium of claim 7, wherein mapping each of the parts to an element of the hierarchical template model conforming to the pre-defined taxonomy comprises:

converting non-standardized input of the information into a standardized format.

13. A system comprising:

one or more processors; and machine-readable media interoperably coupled with the one or more processors and storing one or more instructions that, when executed by the one or more processors, perform operations of a manufacturing plant comprising:

obtaining information pertaining to parts of the manufacturing plant and steps of a process executing on the manufacturing plant;

generating a model by:

initializing an object associated with the parts and the steps of the process;

extracting data from the obtained information associated with the parts and the steps of the process;

validating the extracted data to ensure proper data format and naming conventions; and generating the model to store common properties and the relationships between the parts and the steps of the process;

generating one or more virtual representations associated with each of the parts and the steps of the process based on the model by:

mapping each of the parts to an element of the hierarchical template model conforming to a pre-defined taxonomy, and defining relationships among the parts and the steps of the process;

receiving at least one alert indicating that a metric associated with a particular part of the manufacturing plant satisfies a first predetermined condition;

identifying a second virtual representation that is connected to a first virtual representation of the particular part as defined by the relationships among the parts and the steps of the process, where the second virtual representation reflects a status or metric related to the performance or condition of the part or process step;

determining that a status or metric associated with the second virtual representation satisfies a second predetermined condition, such as the second predetermined condition is a threshold indicating a potential issue or deviation from normal operation;

responsive to determining that the status or metric associated with the second virtual representation satisfies the second predetermined condition, identifying the status or metric as a root cause associated with the at least one alert;

adjusting operation of at least one of the parts based on the root cause;

receiving a query from a user, the query being in conformation with the format of the hierarchical template model; and generating a response to the query based on the one or more virtual representations of the manufacturing plant.

14. The system of claim 13, wherein the operations comprise:

receiving run-time data pertaining to one or more metrics associated with at least one particular part of the manufacturing plant;

updating a status of a corresponding virtual representation associated with the particular part; and updating a status of each of one or more virtual representations connected to the particular part as defined by the relationships among the parts and the steps of the process.

15. The system of claim 13, wherein the second virtual representation is directly connected to the first virtual representation.

16. The system of claim 13, wherein the second virtual representation is connected to the first virtual representation through at least a third virtual representation.

17. The system of claim 13, wherein the virtual representations and interrelationships thereof are represented as a directed graph.

* * * * *